April 6, 1965  J. W. BRIGHTMAN  3,176,744
SELF-LOCKING FASTENING DEVICE
Filed April 23, 1963

INVENTOR
JOHN W. BRIGHTMAN
BY
Brumbaugh, Free, Graves & Donohue
HIS ATTORNEYS 3,176,744
SELF-LOCKING FASTENING DEVICE
John W. Brightman, Ridgewood, N.J., assignor to The Nylok Corporation, Paramus, N.J., a corporation of Delaware
Filed Apr. 23, 1963, Ser. No. 275,141
7 Claims. (Cl. 151—7)

This invention relates to improvements in self-locking threaded fastening devices, and it relates more particularly to an improved type of threaded fastening device having an insert of resilient plastic material therein for coaction with a complemental threaded fastening element whereby improved locking torque and improved reusability are obtained.

In prior strip insert types of threaded fastening devices, the locking action or torque of the device is limited by several factors. The locking strip is received in a slot or recess extending lengthwise of the fastening device, e.g., a screw, the slot or recess intersecting and interrupting the threads over a substantial part of the length of the threaded portion or shank of the screw. Removal or displacement of metal by the formation of the slot or recess weakens the screw measureably and for that reason, it is desirable to keep the radial and circumferential dimensions of the slot or recess as small as possible. With such a slot or recess, the volume of the insert strip and particularly the outer edge portion thereof which engages a complemental fastening element is limited and thereby directly limits the locking torque of the screw.

Another factor which has been a substantial problem in the production of self-locking screws and the like is the tendency of the insert to be lost from the screw or displaced along the slot as the screw is inserted in a complemental threaded member. Displacement along the slot involves two actions, namely, bodily displacement of the insert and longitudinal plastic flow of the material. The result of such longitudinal displacement is that the insert material may be dislodged ahead of the mating fastener from the slot with severe reduction of locking torque provided by the full size insert.

The deficiencies and problems encountered with the prior locking devices are overcome in accordance with the present invention by providing a male or female threaded fastening device such as a screw, bolt, nut insert, coupling or other threaded element, referred to generically hereinafter as a "screw," with a slot or pair of slots in which the edges of an insert strip are received with the midportion of the strip overlying an intervening portion of the screw. In this way, narrow slots which do not unduly weaken the screws may be formed therein and a much wider insert strip can be used than could be accommodated in a slot or recess equal in width to the combined widths of the slots. Moreover, by leaving the threads on the intervening portion of the screw demarcated by the slot or slots, the insert strip is impaled thereon and anchored very firmly against endwise movement relative to the screw.

The insert strip may be quite thin, but due to the firm support at its midportion, it acts as a much wider than normal locking element providing a much higher locking torque than is possible with an equivalent volume of the plastic material in a single slot or recess. Moreover, the locking torque after many reuses of the screw far exceeds the military specifications for such screws, thereby greatly extending their useful operating lives, since the insert has both a backing directly under the bearing surface, at the midpoint between the slots, and room for deflection in the slots themselves without excessive wear.

For a better understanding of the present invention, reference may be had to the accompanying drawing, in which FIGURE 1 is a front elevational view of a typical screw embodying the present invention;

Figure 1:
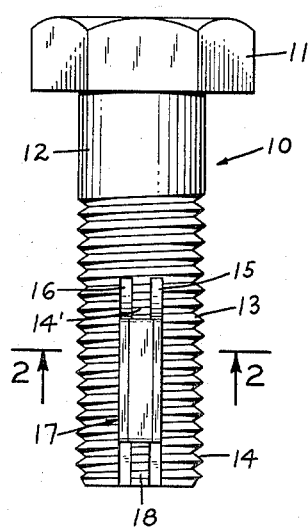

For purposes of illustration, FIGURE 1 shows a hexhead machine screw 10 provided with a locking insert of the type embodying the present invention.

Figure 2:
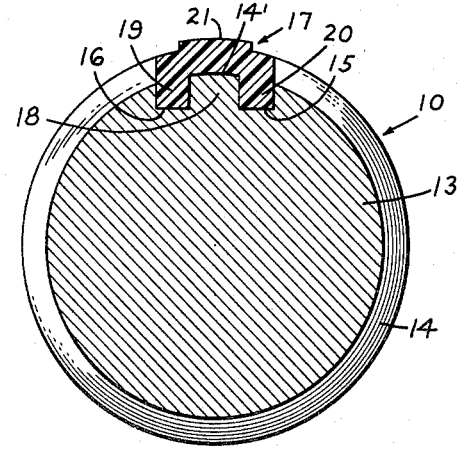
FIGURE 2 is a view in section on a larger scale taken on line 2—2 of FIGURE 1.

The screw 10 includes a head 11, an unthreaded shank portion 12, and a threaded shank portion 13 having threads 14 of any desired shape and pitch thereon. A pair of slots 15 and 16 are formed in and extend lengthwise of the threaded shank portion 13 in any suitable way. For example, the slots 15 and 16 may be formed with a conventional rotary milling cutter, by stamping, or they may be undercut by means of a dovetail cutter or in the manner shown in the Johnson et al. United States application Serial No. 164,826 filed January 8, 1962. The slots 15 and 16 can be quite narrow inasmuch as their purpose is to receive the edges of an insert 17 formed of suitable resilient plastic material such as vulcanized fiber, nylon, "Delrin," "Kel F," or the like. A dividing strip 18 is left between the slots 15 and 16 and as illustrated in FIGURES 1 and 2, has portions 14' of the threads on its outer edge. The dividing strip 18 is somewhat wider than either of the slots 15 and 16, as shown in FIGURE 2, and the combined widths of the slots should be kept sufficiently narrow that the screw 10 is not unduly weakened. In practice, the combined widths of the slots 15 and 16 and the dividing strip 18 should not substantially exceed one-sixth of the circumference of the threaded portion 13 of the screw.

After the slots 15 and 16 have been formed, the insert, which may take the form of a thin strip of resilient plastic, such as nylon, is forced by means of a suitable stamping die downwardly against the surface of the dividing strip 18, and its edges are pressed into and substantially conformed to the shape of the slots 15 and 16. As best seen in FIGURE 2, the stamping operation converts the insert strip into an inverted channel or inverted U-shape having downwardly extending flanges 19 and 20 and a slightly raised midportion 21 overlying and extending outwardly beyond the crests of the threads 14' on the dividing strip 18, as well as the crests of the threads 14 on the outer sides of the slots 15 and 16. By virtue of the fact that the insert 17 is impaled on the threads 14' of the divider strip 18, the insert is firmly anchored against endwise movement along the screw 10 and cannot be displaced endwise by inserting the screw in a complemental threaded member. The insert is also retained strongly in position against radial movement by the tight frictional engagement between it and the walls of the slots, this retaining effect being enhanced by practically doubling the area of contact and also by reason of the fact that the strip is impaled upon the teeth of the divider strip. Retention against radial movement can be improved further by staking the crests of the threads at the outer edges of the slots 15 and 16 to bend them in slightly into indenting relation to the insert. Also, by undercutting the slots 15 and 16 slightly, additional anchoring against radial movement as well as enhanced anchoring against endwise movement is obtained.

Illustrative of the improved action of the new type of insert shown in FIGURES 1 and 2, it has been found that with typical ½ inch, 20-thread per inch screws in which the combined width of the slots and the divider strip, i.e., the pressure area of the insert, is .147 inch, the average initial installation torque of such screws is 57.3 inch pounds. The removal torque after first removal and reinsertion is 48.8 inch pounds as compared with military specifications of 26.3 inch pounds for such a screw. After the fifth removal, the removal torque is 39 inch pounds as compared with military specifications of 20.5. At the tenth removal, the removal torque was 37.5 inch pounds as compared with military specifications of 17.5 inch pounds. The removal torque at the fifteenth removal remained the same and was 2.08 times the military specifications. It will be apparent that while the insert is quite thin because of the small thread clearance, it nevertheless is highly effective in retaining locking torque and is not appreciably removed or ground away by repeated installation and removal. It appears that the excess material is spread between and adhered strongly to the threads.

If for some purposes, the installation torque of the screws is too high, it can be reduced by removing part of the threads from the dividing strip 18, thereby providing less projection of the insert 17 beyond the crests of the threads adjacent to and outside the slots 15 and 16. However, it is desirable to retain at least part of the threads 14' on the dividing strip 18 in order to anchor the insert against endwise movement relative to the screw.

Figure 3:
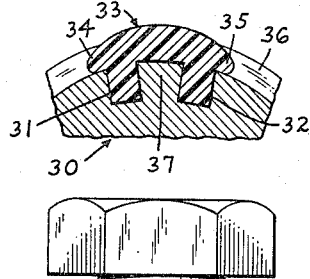
FIGURE 3 is a view in cross section through a portion of a screw having a modified form of insert therein.

FIGURE 3 illustrates another embodiment of the invention in which the screw 30 is provided with a pair of spaced-apart substantially radially directed slots 31 and 32 into which the insert 33 of resilient plastic material is inserted. In this form of insert, the midportion of the insert is compressed so that its edges 34 and 35 flow between the crests of the threads 36 on the screw on opposite sides of the slots, thereby further anchoring the insert 33 against endwise or longitudinal displacement. As in the form of the invention shown in FIGURE 1, the midportion of the insert is impaled on the portions of the thread (not shown) on the rib 37 between the grooves or slots 31 and 32. Due to the radial direction of the slots 31 and 32, the insert is clinched in and around the rib 37 and accordingly is highly resistant to displacement in a radial direction.

Figure 4:
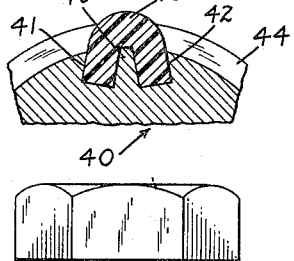
FIGURE 4 is a view in cross section through a screw showing another modification of the insert.
Figure 5:
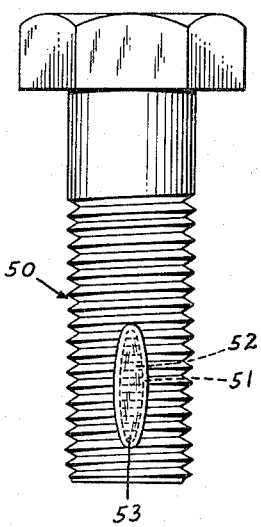
FIGURE 5 is a side elevational view of a screw having another form of insert therein.

FIGURE 4 illustrates another embodiment of the invention in which a screw 40 is provided with a pair of spaced-apart outwardly converging slots 41 and 42 providing a rib 43 between them carrying threads or portions of the threads 44 of the screw on its outer edge. In this form of screw, the resilient insert 45 is folded and its edges are forced into the grooves 41 and 42 and its midportion impaled on the threads on the intervening rib 43. The inwardly diverging relation of the edges of the insert conforming to the outwardly converging slots also acts like an undercut to retain the insert against radial displacement.

As illustrated in FIGURE 1, the slots 15 and 16 are parallel. Parallelism is, however, not necessary. For example, a screw 50 may be provided with a single continuous slot 51 which, as illustrated, may be oval or of elongated polygonal shape having spaced-apart side portions defining a central rib portion 52 therebetween carrying portions of the screw threads on its outer surface. A thin plastic insert 53 is forced against the screw so that its edge portions enter the groove 51 and its midportion is impaled on the threads carried by the central rib portion 52. In this way, a large exposed surface area of the insert 53 is available for engagement with the threads of a complemental threaded element to exert a strong locking torque under conditions of use and repeated reuse.

Figure 6:
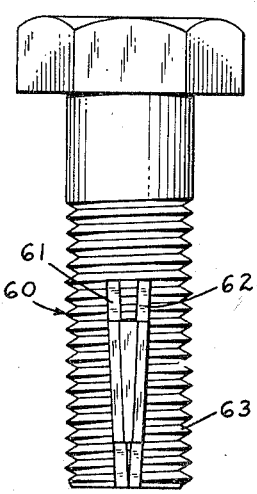
FIGURE 6 is a side elevational view of a screw having still another form of insert therein.

FIGURE 6 illustrates another embodiment of the invention in which a screw 60 is provided with a pair of slots 61 and 62 which converge toward the end of the threaded portion 63 of the screw. The insert, as illustrated, is of the type shown in FIGURES 1 and 2 and is of increasing width from the leading end of the screw towards its head to provide an increasing locking torque as a complemental threaded element is threaded onto the screw.

Figure 7:
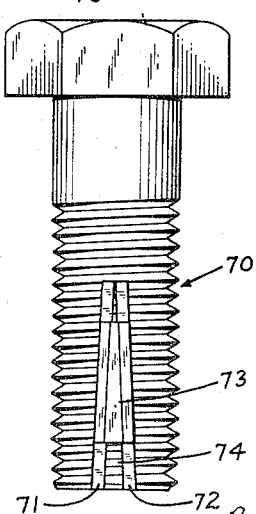
FIGURE 7 is a side elevational view of a screw having another form of insert therein embodying the invention.

FIGURE 7 illustrates a further modification of the invention in which a screw 70 is provided with a pair of spaced slots 71 and 72 which diverge toward the leading end of the screw and receive the edges of a resilient insert 73 which is impaled on the thread portions on the rib 74 between the slots 71 and 72. With this type of insert, the initial resistance to application of the screw to a complemental threaded element is greater than the locking torque afforded upon further insertion of the screw into the complemental member. By the same token, the removal torque of a nut threaded on the screw increases as the nut is being removed from the screw.

While screws have been described herein and shown in the drawings, it will be understood that the new type of locking insert can be utilized equally well in bolts, nuts, threaded couplings, bushings, turnbuckles, reducing inserts and, in fact, in any other threaded fastening or adjusting device in which self-locking properties may be found desirable. Accordingly, the forms of the invention disclosed in the drawings should be considered as illustrative and the invention limited only as defined in the following claims.

I claim:

1. A self-locking fastener comprising a member having threads thereon, a portion having a plurality of sections of said threads on its outer surface demarcated by and separated from the remainder of said threads by a pair of generally longitudinally extending grooves on each lateral side of said portion, said portion extending only partially around the circumference of said member, and a locking insert of resilient plastic material overlying said portion and having lateral edge portions extending into and retained in said grooves, said insert being impaled on said thread sections and thereby retained against lengthwise movement.

2. The self-locking fastener set forth in claim 1 in which said grooves are connected to each other at their opposite ends.

3. The self-locking fastener set forth in claim 1 in which the combined widths of said grooves and intermediate strips span not more than about one-sixth of the circumference of the threaded portion of said member.

4. The self-locking fastener set forth in claim 1 in which said grooves are substantially parallel and narrower than said portion.

5. The self-locking fastener set forth in claim 1 in which said grooves are non-parallel.

6. The self-locking fastener set forth in claim 1 in which said grooves extend radially of said member.

7. The self-locking fastener set forth in claim 1 in which said grooves extend non-radially of said member.

References Cited by the Examiner
UNITED STATES PATENTS
3,010,503   11/61   Beuter _____ 151—7

EDWARD C. ALLEN, *Primary Examiner.*